United States Patent
Sekar et al.

(10) Patent No.: US 11,528,252 B2
(45) Date of Patent: Dec. 13, 2022

(54) NETWORK DEVICE IDENTIFICATION WITH RANDOMIZED MEDIA ACCESS CONTROL IDENTIFIERS

(71) Applicant: Ordr Inc., Santa Clara, CA (US)

(72) Inventors: Sakthi Dasan Sekar, Chennai (IN); Gnanaprakasam Pandian, Cupertino, CA (US); Vivekanandan Vinayagam, San Ramon, CA (US)

(73) Assignee: Ordr Inc., Santa Clara, CA (US)

( * ) Notice: Subject to any disclaimer, the term of this patent is extended or adjusted under 35 U.S.C. 154(b) by 163 days.

(21) Appl. No.: 17/130,461

(22) Filed: Dec. 22, 2020

(65) Prior Publication Data

US 2022/0200950 A1     Jun. 23, 2022

(51) Int. Cl.
| | |
|---|---|
| *H04L 61/50* | (2022.01) |
| *H04L 9/40* | (2022.01) |
| *H04L 67/303* | (2022.01) |
| *H04L 61/4511* | (2022.01) |
| *H04L 101/622* | (2022.01) |

(52) U.S. Cl.
CPC .......... *H04L 61/50* (2022.05); *H04L 61/4511* (2022.05); *H04L 63/20* (2013.01); *H04L 67/303* (2013.01); *H04L 2101/622* (2022.05)

(58) Field of Classification Search
CPC ...... H04L 45/745; H04L 67/303; H04L 61/50
See application file for complete search history.

(56) References Cited

U.S. PATENT DOCUMENTS 8,989,101 B1 * 3/2015 Mishra .................. H04W 48/16
370/252

OTHER PUBLICATIONS

Holub et al., "Detecting Identical Entities in the Semantic Web Data," Proc. of SOFSEM 2015: Theory and Practice of Computer Science, Lecture Notes in Computer Science, vol. 8939, 2015, pp. 519-530.
MAC Address—Wikipedia, <https://en.wikipedia.org/wiki/MAC_address>, Accessed on Jan. 5, 2020, 9 pages.

* cited by examiner

*Primary Examiner* — Esther B. Henderson
(74) *Attorney, Agent, or Firm* — Invoke

(57) ABSTRACT

Techniques are described for analyzing information network traffic to identify distinct devices connected to a network based on characteristics exhibited by the devices. Techniques may analyze some or all of network characteristics, device behavioral patterns, and/or device characteristics detected in network traffic. One or more of these characteristics, may be assigned to a profile associated with a device. This profile, by establishing one or more patterns of behavior and/or characteristics, may be used as a "fingerprint" to uniquely identify a device connected to a network even for devices that employ randomized identifiers, such as MAC addresses, that would otherwise obscure unique identification of the device. Profiles exhibiting similar patterns of behaviors and/or characteristics may be identified and merged to avoid duplicate identification of a same device.

20 Claims, 4 Drawing Sheets

NETWORK DEVICE IDENTIFICATION WITH RANDOMIZED MEDIA ACCESS CONTROL IDENTIFIERS

TECHNICAL FIELD

The present disclosure relates to analyzing information network communications. In particular, the present disclosure relates to identifying devices connected to a network in which the devices may employ randomly selected media access control (MAC) identifiers.

BACKGROUND

Media access control (MAC) addresses (or alternatively, MAC identifiers (IDs)) are assigned by device manufacturers to uniquely identify a device. Various network management systems use the unique MAC address for a variety of purposes. For example, because all devices connected to a network are associated with a unique MAC address, security and inventory network appliances may identify the specific devices connected to the network. These identifications may in turn be associated with an inventory, a permission level, and/or a security threat. Blocks of MAC addresses are usually assigned to specific manufacturers, with a subset of the MAC address characters associated with a particular manufacturer. Network management appliances may also use this information identifying the types of devices connected to an associated network to facilitate management of the network.

However, recent developments in privacy and security techniques enable many devices to change a corresponding MAC address from one value to another value within the block associated with the manufacturer of the device. While obscuring the identity of a unique device from a malicious entity, this capability of a device to change its MAC address also prevents network management appliances from uniquely identifying connected devices. Network management appliances may therefore be frustrated in the execution of tasks that require unique identification of connected devices.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. IDENTIFYING DEVICES BASED ON DEVICE AND/OR NETWORK CHARACTERISTICS
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

One or more embodiments analyze network traffic to identify distinct devices communicating on the network. The system analyzes data packets transmitted to or from a device, associated with a particular MAC address, to build a profile corresponding to the MAC address. The profile may include behavioral patterns, device characteristics, and packet characteristics.

One or more embodiments merge profiles, corresponding to different MAC addresses, to generate a single combined profile in response to determining that the different MAC addresses correspond to a same device. The system determines that the different MAC addresses correspond to a same device if the similarity between the corresponding profiles meet a similarity criteria.

Maintaining a single profile per device, instead of a profile per MAC address, may improve, for example, accuracy of device inventories, device traceability in forensic analysis, among other network management practices.

One or more embodiments described in this Specification and/or recited in the claims may not be included in this General Overview section.

2. Architectural Overview

Figure 1:
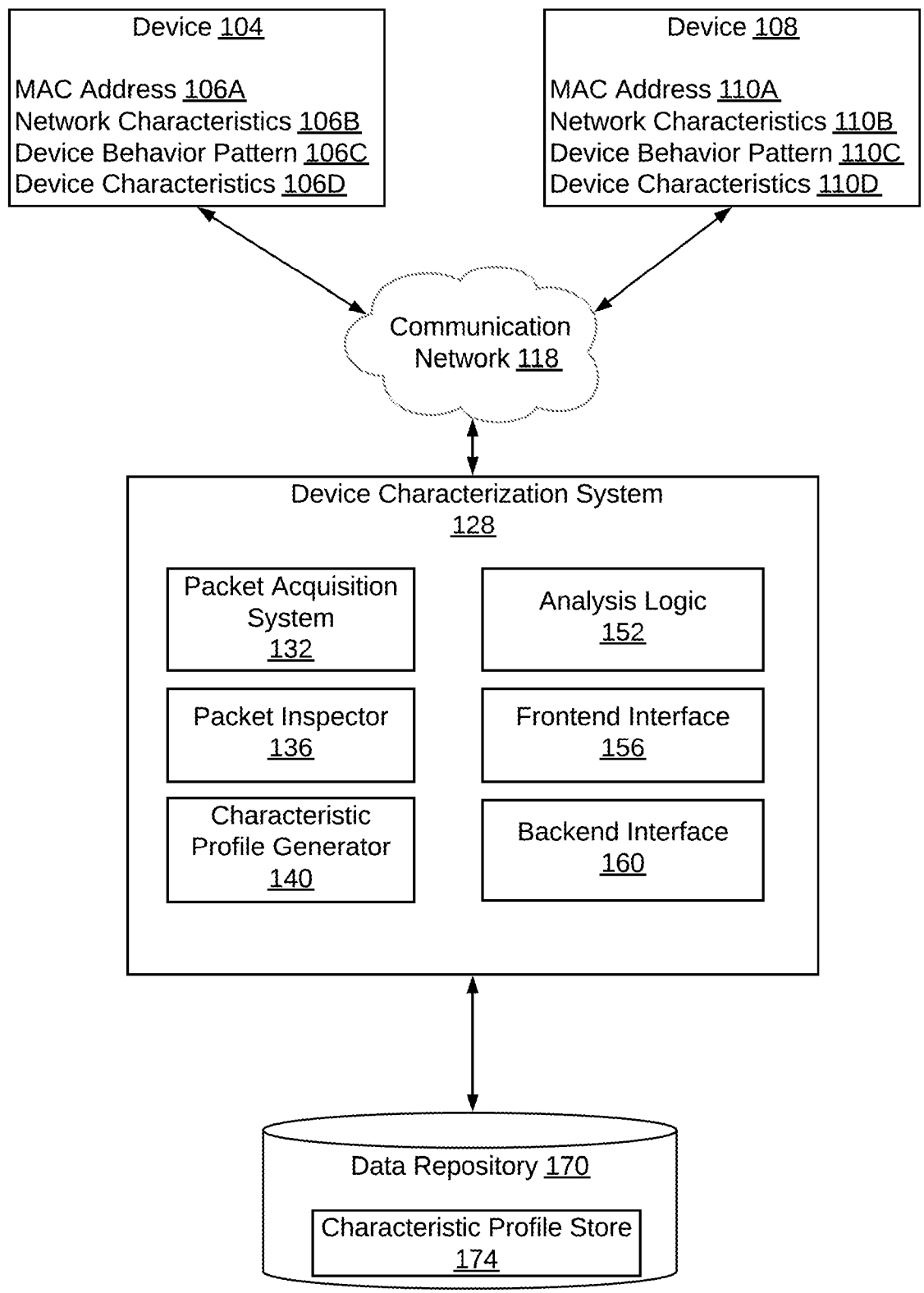
FIG. 1 illustrates a system in accordance with one or more embodiments.

FIG. 1 illustrates a system 100 in accordance with one or more embodiments. As illustrated in FIG. 1, system 100 includes a device 104, a device 108, a communication network 118, device characterization system 128, and a data repository 170. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the device characterization system 128 refers to hardware and/or software configured to perform operations described herein for uniquely identifying a device connected to a network regardless of a randomized MAC address used by the device. To accomplish device identification without relying on a MAC address, the device characterization system 128 may passively collect network transmissions, detect characteristics associated with a device using the network transmissions, and generate a profile corresponding to the device generating the transmissions.

The system may then correlate a particular profile of characteristics with a particular device. In this way, device profiles may be used as a "fingerprint" to uniquely identify corresponding devices. Examples of operations for identifying devices using characteristic profiles instead of a MAC address are described below with reference to FIGS. 2, 3, and 4.

In an embodiment, the various components of the system 100, including the devices 104, 108, and device characterization system 128 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Embodiments of the device 104 and the device 108 may include any type of device that is capable of communicating with the communication network 118. Examples of devices 104, 108 include, but are not limited to, mobile communications devices (mobile phones, laptops, tablets), wired and wireless data collection equipment (bar code scanners, medical devices such as thermometers, X-ray machines, sphygmomanometers and medical imagers), control systems (thermostats), and manufacturing equipment. In still other examples, the embodiments of the devices 104, 108 include network appliances, such as network routers, switches, load balancers, and/or others computer network devices (e.g., servers), among others.

The devices 104, 108 may communicate with the communication network 118 using any number of wired or wireless technologies. Examples of communication technologies employed by the devices 104, 108 include ethernet and Wi-Fi (e.g., wireless communications operating according IEEE 802.11 standards), among others. In some examples, the devices 104, 108 may interact with the communication network 118 using one or more communication protocols, such as HTTP and/or other communication protocols of the Internet Protocol (IP) suite. Other techniques are described in Section 5.0.

The device 104 is associated with a MAC address 106A and the device 108 is associated with a MAC address 110A. While in some situations, the MAC addresses 106A, 110A may be both unique and unchanging, in other situations the MAC addresses 106A, 110A may be occasionally changed to a different value by the corresponding device 104, 108. This occasional re-assignment of MAC address colloquially described as "MAC address randomization," challenges the ability of network management systems to use a device MAC address to uniquely identify a device. This challenge is due to the system incorrectly identifying a single device as multiple devices caused by periodic changes to a corresponding MAC address. This complicates automatic network device inventory monitoring, security protocols, and auditing functions.

The systems and methods described herein overcome the challenges posed by MAC address randomization by identifying characteristics associated with a device that may be collected and analyzed from passively monitored network traffic. In the example system 100, example types of characteristics are illustrated for each of the devices 104 and 108. These types, described below in more detail, are illustrated respectively for the devices 104 and 108 as: network characteristics 106B, 110B; device behavior patterns 106C, 110C; and device characteristics 106D, 110D.

While only two devices 104, 108 are shown in FIG. 1, one advantage of embodiments described herein is that the device characterization system 128 may identify distinct devices connected to a particular local network for tens, hundreds, or even thousands of devices. Furthermore, the clients may be of many different types.

The communication network 118 enables communication between one or more of the device 104, the device 108, and the device characterization system 128. More specifically, transmissions (e.g., data packets transmitted using a corresponding packet network transmission protocol) may be transmitted from the device 104 via the network 118 to the device 108 and vice versa.

Examples of the network 118 include those described below in Section 5, titled "Computer Networks and Cloud Networks." Additional embodiments and/or examples relating to computer networks are also described below in Section 5.

The device characterization system 128 is configured to passively monitor data and analyze transmissions between the communication network 118 and one or more of the devices 104 and 108. The device characterization system 128 may, based on the analysis described below, uniquely identify distinct devices communicating with the network 118 even though the devices 104, 108 employ randomized MAC address techniques that periodically change the associated MAC address.

The device characterization system 128 includes a packet acquisition system 132, a packet inspector 136, a characteristics profile generator 140, analysis logic 152, a frontend interface 156 and a backend interface 160.

The packet acquisition system 132 interacts with the communication network 118 to passively obtain and/or analyze transmissions (e.g., packets) transmitted and/or received by the device 104 and the device 108 via the communication network 118.

In some examples, the packet acquisition system 132 passively monitors the communication network 118 and mirrors (e.g., copies) transmissions from the device 104 and the device 108. In one example, the packet acquisition system 132 may be embodied as a switch port analyzer (SPAN). A switch port analyzer may copy packets transmitted to or from one or more ports in a network. Once successfully copied, the switch port analyzer of the packet acquisition system 132 may forward the copied packets to other elements of the device characterization system 128 for analysis.

In another embodiment, the packet acquisition system 132 passively monitors the communication network 118 via a test access point (TAP) and its associated technology. A test access point is associated with a hardware configuration that copies traffic passing through ports connected to the TAP. For example, a splitter may be used to divide an optical signal transmitted through optical fiber used in a network. Regardless of the technology used, as with the switch port analyzer, the test access point may also provide copied packets to other elements of the device characterization system 128 for analysis.

The packet inspector 136 may execute a deep packet inspection on the packets provided by the packet acquisition system. The packet inspector 136 may inspect both header data and payload data of the packets transmitted by the devices 104 and 108. Executing the deep packet inspection enables the packet inspector 136 to identify various characteristics associated with the packets. In some examples, the characteristics may be identified using a simple network management protocol (SNMP) "trap." The SNMP trap may obtain this metadata from the packets mirrored by the packet acquisition system 132. These characteristics described below in more detail in the context of FIGS. 2, and 3 may be used to identify characteristics within the transmissions. The identified characteristics may then be used to identify a particular device via a corresponding profile and identify different profiles that actually correspond to the same device.

In some examples, the packet inspector 136 obtains metadata related to one or more of the characteristics associated with the device and/or transmission. For example, the packet inspector 136 may identify network characteristics (e.g., average packet size, protocol descriptors, unique DNS requests), device behavior patterns (e.g., device battery level as a function of time of day, data transfer rate), and/or device characteristics (e.g., fully qualified domain name (FQDN), device model, NETBIOS host name).

The characteristics profile generator 140 may receive characteristics acquired by the packet inspector 136 and use this information to generate profiles of characteristics corresponding to various devices. These stored profiles, used as "fingerprints" for corresponding devices, may then be used to uniquely identify the devices, in some examples. The characteristic profiles may be stored (e.g., in characteristic profile store 174 of the data repository 170) so that characteristics gathered from additional transmissions may be conveniently compared to the stored characteristics as part of identifying the devices associated with the additional transmissions.

The analysis logic 152 may uniquely identify distinct devices by analyzing the various detectable characteristics, which may then be used to uniquely identify a device and one or more corresponding profiles. In some examples, devices initially presumed to be different (e.g., based on different MAC addresses) may be determined to be the same based on the analysis of the characteristics. In this case, different profiles associated with a same device may be merged.

In some examples, the analysis logic 152 may process acquired data packet characteristics associated with a device into feature vectors. In one example, a feature vector may be represented as $[f_1, f_2, f_3, f_4]$, where $f_1, f_2, f_3$ correspond to characteristics and where $f_4$ is a non-characteristic feature, such as a user or system applied label.

The analysis logic 152 may then use the feature vectors to determine whether characteristics associated with different device profiles (and two different MAC addresses) in fact correspond to a same device. In one example, the analysis logic 152 may compare feature vectors corresponding to different profiles via a cosine similarity analysis. The analysis logic 152 may apply other comparison algorithms may to compare feature vectors corresponding to different profiles.

Upon determining that multiple profiles actually correspond to a same device, the analysis logic 152 may coordinate or otherwise cause the multiple profiles to be merged into a single profile.

In one or more embodiments, frontend interface 156 refers to hardware and/or software configured to facilitate communications between elements of the system 100, and between the elements of the system 100 and a user. Frontend interface 156 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of frontend interface 156 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, frontend interface 156 is specified in one or more other languages, such as Java, C, or C++.

Backend interface 160 may include an API, CLI, or other interfaces for invoking functions to execute actions. One or more of these functions may be provided through cloud services or other applications, which may be external to the system 128. For example, one or more components of system 128 may invoke an API to access information stored in data repository 170, such as device profiles. As another example, an API in the backend interface 160 may access communication systems used by the packet acquisition system 132 to capture network transmissions. It will be appreciated considering these examples that the actions that are performed may vary from implementation to implementation.

In some embodiments, the system 128 may access external resources, such as cloud services. Example cloud services may include, but are not limited to, social media platforms, email services, short messaging services, enterprise management systems, data storage systems, virtualized communication interfaces, and other cloud applications. Backend interface 160 may serve as an API endpoint for invoking a cloud service. For example, backend interface 160 may generate outbound requests that conform to protocols ingestible by external resources. Backend interface 160 may process and translate inbound requests to allow for further processing by other components of the system 128. The backend interface 160 may store, negotiate, and/or otherwise manage authentication information for accessing external resources. Example authentication information may include, but is not limited to, digital certificates, cryptographic keys, usernames, and passwords. Backend interface 160 may include authentication information in the requests to invoke functions provided through external resources.

In one or more embodiments, a data repository 170 is any type of storage unit and/or device (e.g., a file system, database, collection of tables, or any other storage mechanism) for storing data. Further, a data repository 170 may include multiple different storage units and/or devices. The multiple different storage units and/or devices may or may not be of the same type or located at the same physical site. Further, a data repository 170 may be implemented or may execute on the same computing system as the device characterization system 128. Alternatively or additionally, a data repository 170 may be implemented or executed on a computing system separate from the device characterization system 128. A data repository 170 may be communicatively coupled to the device characterization system 128 via a direct connection or via a network (e.g., the communication network 118).

Information describing the stored characteristic profiles associated with one or more identified devices may be implemented across any of components within the system 100. However, this information is illustrated within the data repository 170 as characteristic profile store 174 for purposes of clarity and explanation.

3. Identifying Devices Based on Device and/or Network Characteristics

Figure 2:
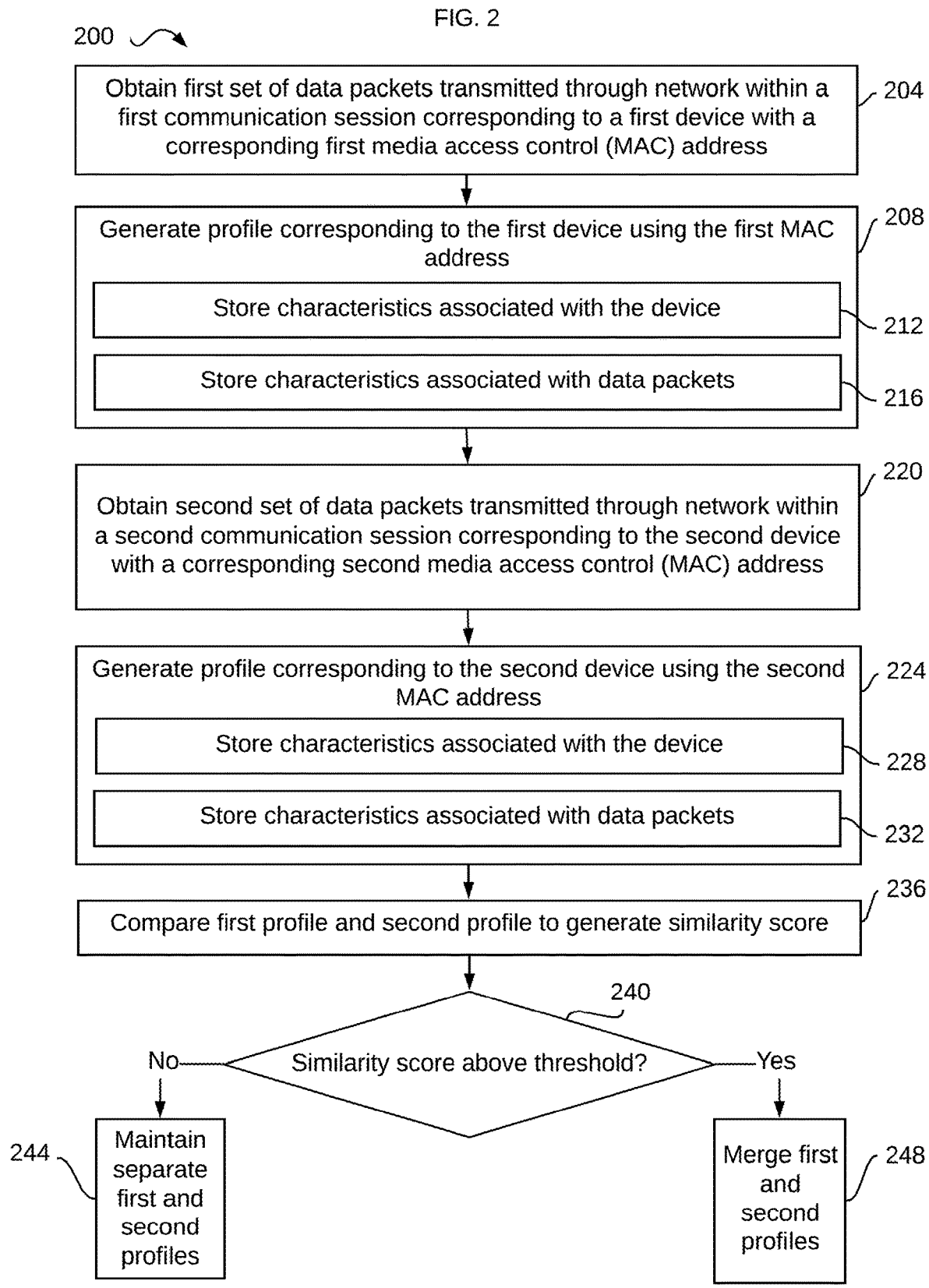
FIG. 2 illustrates an example set of operations for identifying a device connected to a network based on one or more characteristics detected in association with the device, in accordance with one or more embodiments.

The method 200, example operations of which are illustrated in FIG. 2, may be used to identify a device transmitting and/or receiving packets using device and/or data packet characteristics. The system may identify the device independently of the MAC address associated with the packets, thereby overcoming the challenges created by MAC address randomization described above.

The method 200 may begin by first obtaining one or more data packets transmitted through a network (operation 204). In some embodiments, the system identifies and obtains data packets associated with a first device (using a corresponding first MAC address) that is communicating via the network in association with a first communication session (operation 204).

The data packets of the first set may be obtained using techniques described above in the context of FIG. 1. For example, the packets may be passively obtained by copying packets that pass through a TAP or other passive packet mirroring appliance.

Once obtained, the system may generate a profile that corresponds to the first device using the first MAC address identified within the packets (operation 208). The generated profile may include the first MAC address corresponding to the first device and various characteristics.

The characteristics collected from the packets transmitted during the first communication session and stored in the first device profile may include characteristics associated with the first device itself (operation 212), characteristics associated with the data packets (operation 216), or both. Various examples of characteristics are described in more detail in the context of FIG. 3. At a high level, one broad type of characteristic includes characteristics associated with the device itself. In some examples, for convenience of explanation, characteristics associated with the device itself may be separated into two sub-types: device-specific characteristics and device behavior patterns. A second type of broad characteristic are those characteristics associated with data packets transmitted from the device, which may be referred to as network characteristics for convenience.

Collecting data in the operations 208, 212, and 216 and storing the data in an associated profile facilitates the analyses of communication sessions and identification of unique devices, as described herein.

In some examples, a profile may be instantiated as one or more table entries corresponding to a profile identifier. In other words, the stored characteristics and identifiers (e.g., a temporary profile or device identifier assigned to the profile during data packet monitoring and profile generation), may be stored as row or column data in a data object.

In some examples, the collected profile characteristics may be represented as a feature vector. Representing values corresponding to the device and/or data packet characteristics as feature vectors improves the convenience with which profiles associated with a device are compared. For example, characteristics obtained for a particular device and represented as a feature vector may be conveniently compared to feature vectors stored from prior analyses by a similarity scoring analysis, such as a cosine similarity analysis.

In some examples, a profile may include one or more subsets of characteristics grouped or clustered based on frequency of observation in the set(s) of historical communications associated the device, confidence interval(s) that indicate a likelihood that a particular combination of characteristics or a subset of characteristics identifies the particular corresponding device, reference(s) to feature vector(s), a device identifier (or identifiers) and/or a profile identifier. As indicated above, a device identifier may include a MAC address previously used by the device and used by the system to associate transmissions with the device (regardless of the MAC address that the device has selected to identify itself), and a system (or user) applied label. The system may also include a profile identifier that, if unique, may optionally be used to uniquely identify the corresponding device.

The method 200 may continue performing the data collection and profile generation operations for a second set of data packets transmitted via the network within a second communication session (operation 220). Unlike the preceding operations, however, the second set of data packets transmitted in the second communication session may correspond to a second MAC address different from the first MAC address (operation 220). Once obtained, a profile may be generated corresponding to the second device (operation 224). The profile, which stores the second MAC address associated with the second device, also stores one or more characteristics associated with the device (operation 228) and characteristics associated with the data packets (operation 232).

For devices and systems that do not employ MAC address randomization, a difference between the first MAC address and the second MAC address would indicate two distinct devices. However, as explained above, the presumption that each MAC address uniquely identifies a corresponding device is not valid given the use of MAC address randomization. In light of this, the first and second profiles are compared to determine whether these devices exhibit similar characteristics and therefore may be the same device despite different MAC addresses (operation 236).

As indicated above, characteristics obtained by the system for a particular device during a particular communication session may be represented as feature vectors. The system may compare the feature vectors corresponding to (or otherwise representing some or all of) the first and second profiles in operation 236 using a vector comparison, such as a cosine similarity analysis. This analysis may generate a similarity score.

The system then determines whether the similarity score is sufficient to indicate whether or not the first and second devices are the same. More specifically, the system determines whether the similarity score (e.g., the "angle" between the vectors in a cosine similarity analysis) is greater than or less than a threshold value (operation 240).

If the similarity score is below a threshold, then the system may determine that the differences between one or more of the characteristics corresponding to the first and second profiles are significant enough that the associated devices are distinct from one another (operation 244). In this case, the first and second profiles are maintained separately because the system has determined that, based on the characteristics, these devices are distinct from one another.

If the similarity score is above the threshold, then the system may determine that the differences between one or more of the characteristics corresponding to the first and second profiles are small enough that the devices associated with the first and second profiles are in fact the same device. In this case, the first and second profiles corresponding to the first and second devices are merged into a single profile (operation 248). As described herein, this improves the accuracy of device inventories by removing duplicate entries for the same device caused by MAC address randomization and also improves forensic analysis for security breaches. In some cases, the two profiles may be merged into a third profile. In other cases, the two profiles are merged by copying data from one profile into the other, or otherwise logically associating the two profiles together as a single profile data structure.

While the method 200 is described in the context of two devices and a comparison of their corresponding profiles, this is for convenience of illustration. More generally, in some embodiments, a profile corresponding to a target device (and communication session) may be generated and compared to one or more stored profiles to determine whether the target device is already known to the system.

Figure 3:
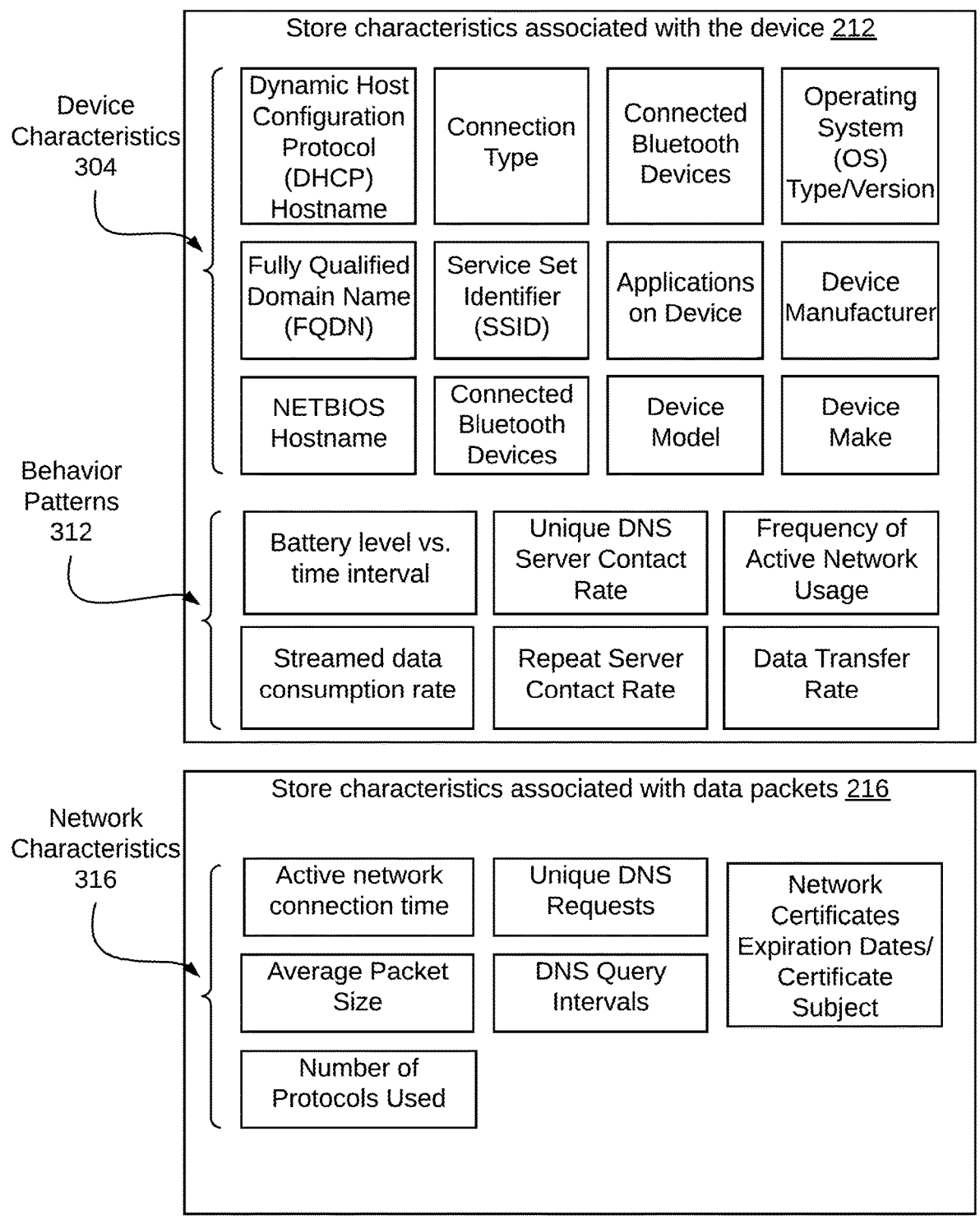
FIG. 3 illustrates various device and data packet characteristics, some or all of which may be stored in a profile and used to uniquely identify a device regardless of the MAC address used by the device, in accordance with an embodiment.

FIG. 3 illustrates, in the context of operations 212 and 216, various example characteristics associated with a device and associated with data packets, respectively. As explained above, combinations of these characteristics may be used as a "fingerprint" to uniquely identify a device regardless of, and independently from, a MAC address.

Turning first to the characteristics associated with a device itself, these characteristics may actually be grouped for convenience of explanation into device characteristics 304 and behavior patterns 312 exhibited by a device. Other characteristics not depicted in FIG. 3 may be included for the purposes of identifying a device without relying on a MAC address. Furthermore, various embodiments described herein may employ any combination of these characteristics to uniquely identify a device without relying on a MAC address.

In some embodiments, for example enterprise-scale networks, device characteristics 404 alone may be insufficient for uniquely identifying the many devices connected to a network. For these examples in which dozens, hundreds, thousands, or even tens of thousands of devices are connected to a network, one or more of the device characteristics 304 may be combined with one or more device behavior patterns 312 and/or one or more network characteristics 316 to uniquely identify a device without relying on a MAC address.

The device characteristics 304 depicted in FIG. 3 include a variety of characteristics that are presented for illustration purposes only. Any one or more of the device characteristics 304 may be used (in combination with behavior patterns 312 and/or network characteristics 316) to uniquely identify a device. The following description explains each of the example device characteristics 304.

Dynamic host configuration protocol (DHCP) hostname corresponds to a (human readable) name of the device itself, often assigned by an end user and/or network administrator. While a helpful characteristic that may, in some examples, uniquely identify a device, this characteristic also illustrates the challenges presented in enterprise networks with many devices. For example, a common DHCP hostname corresponds to the user's name (e.g., "Ben's PC" or "Mary's Mac"). An organization with thousands of users is likely to have many employees with the same name, thereby reducing the uniqueness of the DHCP hostname. In some examples, DHCP hostname may be most useful when employed in combination with other characteristics.

Fully qualified domain name (FQDN) specifies a precise location in a network tree hierarchy of a device within a corresponding domain name system (DNS). Because the FQDN specifies the precise location of a device within a network, this characteristic may be useful (in combination with other characteristics) for uniquely identifying a device.

A network basic input/output system (NETBIOS) hostname is a device name used by a corresponding device to communicate with other devices via the session layer of a TCP/IP local area network (LAN).

A connection type characteristic is a binary characteristic that indicates whether a device communicates with a network via a wired connection (e.g., Ethernet) or a wireless connection (e.g., via an IEEE 802.11 protocol). The wired connection and wireless connection are equivalently referred to as a wired communication interface and a wireless communication interface at other locations herein.

The service set identifier (SSID) is an identifier that corresponds to a wireless network (e.g., a wireless LAN) through which a device communicates. In some examples, again in an enterprise setting or a multi-office setting, multiple networks may facilitate communications in different physical locations. For example, each floor in an office building or each suite on a floor may have a separate LAN and therefore a distinct SSID. In another example, offices in different geographic locations (e.g., New York and San Francisco) may each have separate wireless networks and therefore separate SSIDs.

Wireless peripheral devices connected to a device may also be used to distinguish (network-connected) devices from one another. For example, a number of peripheral Bluetooth devices may be used to distinguish devices from one another. In other examples, the types of peripheral Bluetooth devices (e.g., headphones, keyboard, microphone, mobile computing device), and the makes/models of these devices (e.g., Bose® QC20 headphones, Microsoft® wireless keyboard, Apple® iPhone® 9) may further be used to distinguish devices from one another.

Computing applications installed and operating on a device are another characteristic that may be used, in combination with other characteristics, to uniquely identify device or enable devices connected to a network to be distinguished from one another. In some examples, the computer applications installed (and/or operating) on a device can be inferred based on identification of servers that the devices communicate with. For example, the system may infer that Netflix®, Amazon®, or Public Broadcasting Service computing applications are loaded onto a device based on communication between the device and servers corresponding to those entities.

Various other characteristics that are specific to a device or fundamental device operating capabilities may be used in some examples. For example, the system may identify and use a device manufacturer (e.g., Apple®, Google®, HP®), a device make (e.g., iPhone®, Chromebook®, EliteBook® Laptop), and a device model. In other examples, the system may also identify and use an operating system (OS) name, family identifier (e.g., a generation name such as "Windows 10"®, "Mac OS Catalina"®, or "Chrome Gingerbread"®), and/or a version number and/or release number.

In some embodiments, behavior patterns 312 exhibited by a device may be used to distinguish between devices and, ultimately, uniquely identify devices regardless of the MAC address used by the device.

One example of a behavior pattern 312 is that of a device battery power level within one or more particular time intervals. For example, different types of computing operations will cause different rates of power consumption and therefore, when not connected via a power cord, different levels of battery power levels as a function of time. Additionally, different computing applications may be executed at different times during a day or a week, leading to characteristic battery power levels as a function of time or time interval. For example, devices used primarily for reading applications or for routine business operations (e.g., web-based email clients, instant messaging, voice communications) may have a relatively low battery drain rate and deplete a battery slowly and uniformly throughout a particular time period. In contrast, video streaming or gaming applications tend to consume battery power much faster than reading and may be more likely to be used later in the day. Regardless of the cause, the manner in which a device is used may produce different battery depletion profiles that may be used to distinguish between devices.

Similarly, a rate at which data is streamed may be a pattern of behavior 312 that may distinguish devices. As with the preceding example of battery power level, different computing applications consume data streams at different rates, in large part according to the media type being consumed. For example, video data may be associated with higher data stream rates whereas audio data may be associated with a lower data stream rate. These patterns of data stream rate may also vary within a defined period of time (e.g., a day, a week), or cyclically. For example, video streaming in the evenings and on weekends may drive high data consumption rates periodically, which may be used to distinguish between devices.

While the preceding characteristic is specific to streamed data, another characteristic may measure a total data transfer rate during a time period (e.g., an hour, a workday, a day, a week, a month). This may include data transfers that are not necessarily streams but transmitted using non-streaming protocols. Examples include computing applications in which text data is received such as reading applications, email applications, and refreshes or renderings of static webpages.

A number of unique DNS server requests over the course of a time period (i.e., a contact rate) may also be a behavior pattern 312 characteristic used to distinguish between devices. In many cases, users may visit particular websites repeatedly. This characteristic identifies the number of requests sent to different DNS servers during a period of time (e.g., a day, a week, a month), rather than a total of number of DNS server requests, many of which may be to the same DNS servers. In contrast, a different behavioral pattern 312 characteristic may measure a number of repeated DNS server requests over the course of a time period (i.e., a contact rate).

In another example of a device behavior pattern 312, the system may detect a frequency of active network usage. For example, a particular device may be connected to a network, but not actively transmitting or receiving packets through the network for any number of reasons. Regardless of the reasons, a pattern of inactivity may be characteristic of a device.

As described above, some characteristics used to uniquely identify a device regardless of the MAC address include those associated with data packets themselves (operation 216). In FIG. 3, one example type of data packet characteristics are network characteristics 316.

One example of a network characteristic 316 is the active network connection time exhibited by a device. That is, even devices connected to a network may experience periods (i.e., durations of time) of inactivity. One type of inactive period may be associated with a power-saving mode (e.g., sleep or standby mode). In other examples, inactivity may be associated with a lack of use of the device. For example, even when not in a power-saving mode, a device may be idle as exhibited by no transmitted DNS requests, no packets transmitted to a server or local network device (e.g., a router) and/or a lack of active communications with an associated network. This inactivity may occur periodically or according to a pattern that may be used to distinguish between devices.

Another network characteristic 316 is an average packet size transmitted to and/or from a device. An average packet size may be associated with a particular device because of the protocols and applications engaged by the user. As with many other characteristics, the average packet size may be measured and analyzed as a function of time of day, day of week, or other time period (e.g., 15 minute periods, 1 hour periods). For example, checking an email application, starting a particular computing application, or otherwise engaging in particular user behaviors may cause discernable patterns in the average packet size transmitted to and/or from a particular device.

Similarly, a number and/or the types of different protocols used by a device may be used, with other characteristics described herein, as a characteristic that may identify a device. The number of protocols used by a device, such as TCP, UDP, among others, is indicative of the types of operations executed by the device, and thus the work performed by the device.

The number of unique DNS requests and/or a number of DNS queries (unique or total) within a time period may also be used to distinguish between devices in combination with other characteristics describes herein. These characteristics are described above in the context of device behavior patterns 312. Whether these characteristics may be included either as a behavior pattern 312 or a network characteristic 316.

Another network characteristic 316 is an expiration date of a network certificate and the certificate subject. The values associated with these fields are present in a data packet and used to transmit certificate information to a client device. In some examples, when a network certificate is detected, the certificate subject (e.g., an identifier of a server or website issuing the certificate) is identified along with an associated expiration date. These data may be associated with a profile of a device. In other analyses, the system may query a device to identify any network certificate data (e.g., expiration date, subject) stored thereon. Network certificate data stored on a device may be compared to previously identified network certificate data stored in a device profile. Identifying a particular device that is storing network certificate data that matches network certificate data stored in profile may be used to associated the particular device with the profile.

As described above, any selected combination of these various characteristics may be identified and stored in a profile associated with a device (as described in the context of operations 212, 216, 228, 232) and used to uniquely identify a device according to the method 200.

4. Example Embodiment

In one example illustration, a device that employs MAC address randomization establishes a first communication session with a network and exhibits MAC address AA:AA:AA:AA:AA. A first profile may be generated based on characteristics associated with the device and/or data packets transmitted to and/or from the device. The characteristics may include DHCP hostname, FQDN, applications operating on the device, number of protocols, OS type and version, among any of the other characteristics illustrated in FIG. 3. The system may generate a first feature vector based on the collected characteristics, which may then be stored in the associated profile.

After termination of the first session, the device may establish a second communication session with the network. Because the device employs MAC address randomization, the device exhibits a different MAC address to the network: BB:BB:BB:BB:BB. The system collects characteristics, such as those described above, generates a second profile associated with the characteristics, and generates a second feature vector representing the characteristics.

The system then may compare the first and second feature vectors to determine whether the devices associated with the two different MAC addresses AA:AA:AA:AA:AA and BB:BB:BB:BB:BB are the same device or different devices. As described above, the system may use a cosine similarity analysis to determine whether the vectors represent the same device or different devices. Upon determining that the cosine similarity value is above a threshold, the system determines that the MAC addresses AA:AA:AA:AA:AA and BB:BB:BB:BB:BB in fact correspond to the same device because the characteristics associated with these two different MAC addresses are so similar.

The system may then merge the first and second profiles. Merging the profiles improves the accuracy of a device inventory. Also, uniquely identifying devices connected to the network may improve forensic analysis of network performance deviations and/or security breaches. For example, a security policy (e.g., permissions associated with the device, blacklist restrictions, whitelist permissions) may be applied (or re-applied) to the device once the two different MAC addresses are identified as belonging to the same device. That is, the pre-existing security policies and permissions previously established for the device exhibiting MAC address AA:AA:AA:AA:AA may be extended to transmissions exhibiting the MAC address BB:BB:BB:BB:BB because the devices are in fact the same. Similarly, a device inventory that lists these two devices separately may remove one of entries or replace the two entries with a common entry that encompasses both profiles.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
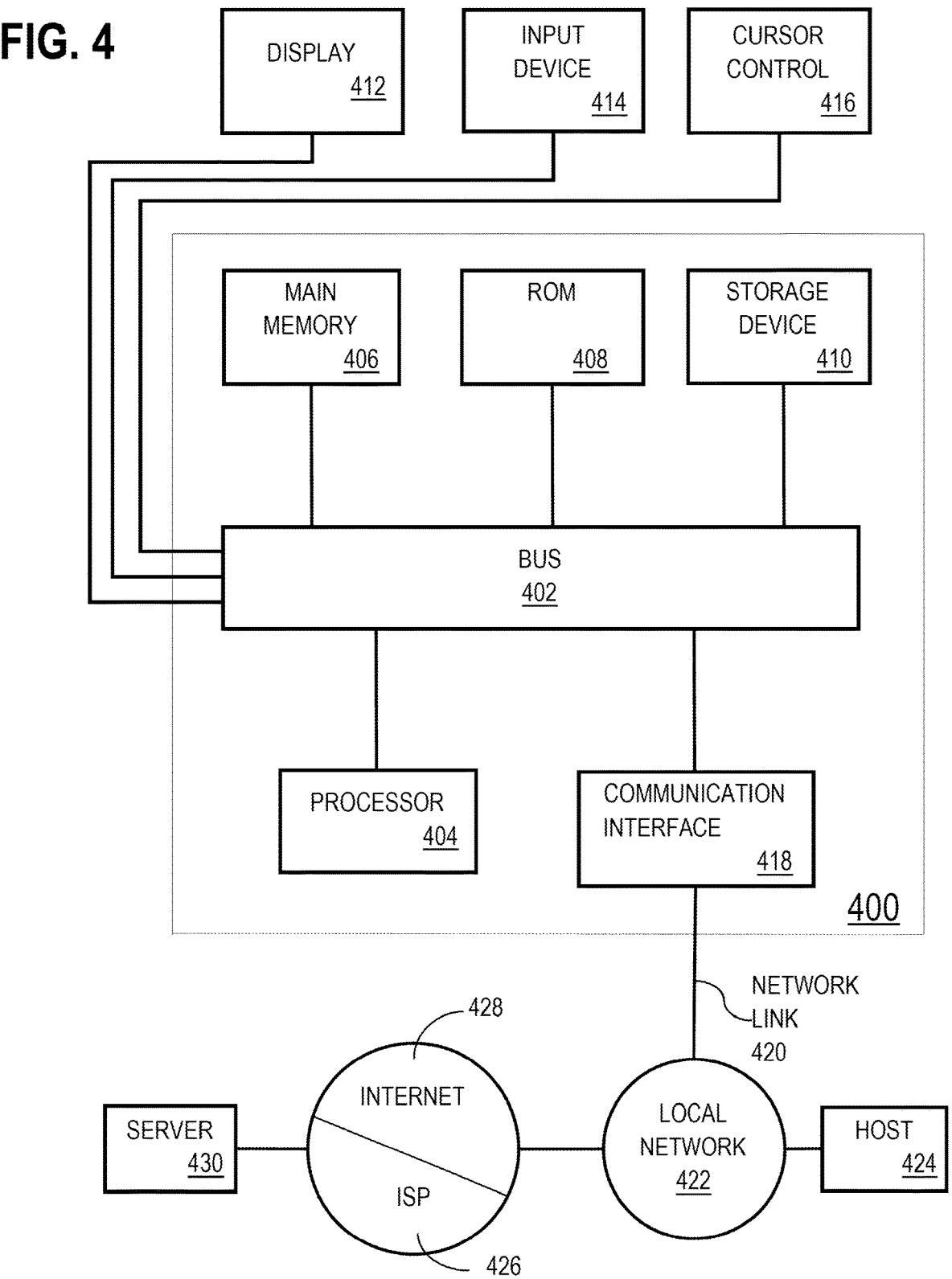
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   obtaining a first plurality of data packets, transmitted to or from a first device, within a first communication session corresponding to a first Media Access Control (MAC) address associated with the first device on a network;
   generating a first profile, in association with the first MAC address, based on one or more of (a) characteristics associated with the first device or (b) characteristics associated with the first plurality of data packets;
   obtaining a second plurality of data packets, transmitted to or from a second device, within a second communication session corresponding to a second Media Access Control (MAC) address associated with the second device on a network;
   generating a second profile, in association with the second MAC address, based on one or more of (a) characteristics associated with the second device or (b) characteristics associated with the second plurality of data packets;
   comparing the first profile and the second profile to determine the first MAC address and the second MAC address correspond to a same device; and
   responsive to determining that the first MAC address and the second MAC address correspond to the same device, merging the first profile and the second profile to generate a third profile.

2. The non-transitory computer readable medium of claim 1, wherein the characteristics associated with the first plurality of data packets and the second plurality of data packets comprise one or more of: a device inactivity duration, an average packet size, a number of protocols used in network communications, a number of unique DNS requests, and an interval between unique DNS queries.

3. The non-transitory computer readable medium of claim 1, wherein characteristics associated with the first device and the second device comprise one or more corresponding: dynamic host configuration protocol (DHCP) host names, fully qualified domain names (FQDN), netbios host names, wired or wireless communication interfaces, a service set identifiers (SSID), a set of identifiers corresponding to connected Bluetooth devices, a set of one or more installed computing applications, operating system characteristics, device models, and device manufacturers.

4. The non-transitory computer readable medium of claim 3, wherein the operating system characteristics comprise one or more of an operating system name, an operating system family identifier and an operating system version number.

5. The non-transitory computer readable medium of claim 1, wherein characteristics associated with the first device further comprise device behavioral patterns that include one or more of an average battery charge level during a first time interval, an average data stream consumption rate, a number of unique DNS servers queried during a second time interval, a number of repeated DNS servers queried during the second time interval, a frequency of active network usage, a data transfer rate during a third time interval.

6. The non-transitory computer readable medium of claim 1, wherein:
   the first profile comprises a security policy associated with the first device; and
   responsive to merging the first profile and the second profile into the third profile, re-applying the security policy to the same device previously identified as the first device associated with the first MAC address and the second device associated with the second MAC address.

7. The non-transitory computer readable medium of claim 1, wherein the comparing operation comprises:
   generating a first feature vector based on one or more characteristics associated with the first device;
   generating a second feature vector based on one or more characteristics associated with the second device;
   determining a similarity score between the first feature vector and the second feature vectors;
   responsive to the determining operation:
      identifying the first device and the second device as the same device if the similarity score is above a threshold value; and
      identifying the first device and the second device as different devices if the similarity score is below the threshold value.

8. A method comprising:
   obtaining a first plurality of data packets, transmitted to or from a first device, within a first communication session corresponding to a first Media Access Control (MAC) address associated with the first device on a network;
   generating a first profile, in association with the first MAC address, based on one or more of (a) characteristics associated with the first device or (b) characteristics associated with the first plurality of data packets;
   obtaining a second plurality of data packets, transmitted to or from a second device, within a second communication session corresponding to a second Media Access Control (MAC) address associated with the second device on a network;
   generating a second profile, in association with the second MAC address, based on one or more of (a) characteristics associated with the second device or (b) characteristics associated with the second plurality of data packets;
   comparing the first profile and the second profile to determine the first MAC address and the second MAC address correspond to a same device; and
   responsive to determining that the first MAC address and the second MAC address correspond to the same device, merging the first profile and the second profile to generate a third profile.

9. The method of claim 8, wherein the characteristics associated with the first plurality of data packets and the second plurality of data packets comprise one or more of: a device inactivity duration, an average packet size, a number of protocols used in network communications, a number of unique DNS requests, and an interval between unique DNS queries.

10. The method of claim 8, wherein characteristics associated with the first device and the second device comprise one or more corresponding: dynamic host configuration protocol (DHCP) host names, fully qualified domain names (FQDN), netbios host names, wired or wireless communication interfaces, a service set identifiers (SSID), a set of identifiers corresponding to connected Bluetooth devices, a set of one or more installed computing applications, operating system characteristics, device models, and device manufacturers.

11. The method of claim 10, wherein the operating system characteristics comprise one or more of an operating system name, an operating system family identifier and an operating system version number.

12. The method of claim 8, wherein characteristics associated with the first device further comprise device behavioral patterns that include one or more of an average battery charge level during a first time interval, an average data stream consumption rate, a number of unique DNS servers queried during a second time interval, a number of repeated DNS servers queried during the second time interval, a frequency of active network usage, a data transfer rate during a third time interval.

13. The method of claim 8, wherein:
the first profile comprises a security policy associated with the first device; and
responsive to merging the first profile and the second profile into the third profile, re-applying the security policy to the same device previously identified as the first device associated with the first MAC address and the second device associated with the second MAC address.

14. The method of claim 8, wherein the comparing operation comprises:
generating a first feature vector based on one or more characteristics associated with the first device;
generating a second feature vector based on one or more characteristics associated with the second device;
determining a similarity score between the first feature vector and the second feature vectors;
responsive to the determining operation:
identifying the first device and the second device as the same device if the similarity score is above a threshold value; and
identifying the first device and the second device as different devices if the similarity score is below the threshold value.

15. A system comprising:
at least one device including a hardware processor;
the system being configured to perform operations comprising:
obtaining a first plurality of data packets, transmitted to or from a first device, within a first communication session corresponding to a first Media Access Control (MAC) address associated with the first device on a network;
generating a first profile, in association with the first MAC address, based on one or more of (a) characteristics associated with the first device or (b) characteristics associated with the first plurality of data packets;
obtaining a second plurality of data packets, transmitted to or from a second device, within a second communication session corresponding to a second Media Access Control (MAC) address associated with the second device on a network;
generating a second profile, in association with the second MAC address, based on one or more of (a) characteristics associated with the second device or (b) characteristics associated with the second plurality of data packets;
comparing the first profile and the second profile to determine the first MAC address and the second MAC address correspond to a same device; and
responsive to determining that the first MAC address and the second MAC address correspond to the same device, merging the first profile and the second profile to generate a third profile.

16. The system of claim 15, wherein the characteristics associated with the first plurality of data packets and the second plurality of data packets comprise one or more of: a device inactivity duration, an average packet size, a number of protocols used in network communications, a number of unique DNS requests, and an interval between unique DNS queries.

17. The system of claim 15, wherein characteristics associated with the first device and the second device comprise one or more corresponding: dynamic host configuration protocol (DHCP) host names, fully qualified domain names (FQDN), netbios host names, wired or wireless communication interfaces, a service set identifiers (SSID), a set of identifiers corresponding to connected Bluetooth devices, a set of one or more installed computing applications, operating system characteristics, device models, and device manufacturers.

18. The system of claim 15, wherein characteristics associated with the first device further comprise device behavioral patterns that include one or more of an average battery charge level during a first time interval, an average data stream consumption rate, a number of unique DNS servers queried during a second time interval, a number of repeated DNS servers queried during the second time interval, a frequency of active network usage, a data transfer rate during a third time interval.

19. The system of claim 15, wherein:
the first profile comprises a security policy associated with the first device; and
responsive to merging the first profile and the second profile into the third profile, re-applying the security policy to the same device previously identified as the first device associated with the first MAC address and the second device associated with the second MAC address.

20. The system of claim 15, wherein the comparing operation comprises:
generating a first feature vector based on one or more characteristics associated with the first device;
generating a second feature vector based on one or more characteristics associated with the second device;
determining a similarity score between the first feature vector and the second feature vectors;
responsive to the determining operation:
identifying the first device and the second device as the same device if the similarity score is above a threshold value; and identifying the first device and the second device as different devices if the similarity score is below the threshold value.

* * * * *